(12) United States Patent
Monrad et al.

(10) Patent No.: US 6,438,122 B1
(45) Date of Patent: Aug. 20, 2002

(54) METHOD RELATED TO GPRS (GENERAL PACKET RADIO SERVICE) SYSTEM PROVIDING PACKET SWITCHED CONNECTIONS

(75) Inventors: Atle Monrad, Froland; Ole Jonny Gangsøy, Arendal, both of (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/079,852

(22) Filed: May 15, 1998

(30) Foreign Application Priority Data

May 20, 1997 (NO) ................................................. 97.2279

(51) Int. Cl.$^7$ ................................................. H04J 3/24
(52) U.S. Cl. ........................ 370/349; 370/352; 370/469
(58) Field of Search ................................ 370/338, 349, 370/389, 400, 410, 465, 469, 471, 475, 476, 522, 395, 397, 399, 352, 401, 406

(56) References Cited

U.S. PATENT DOCUMENTS

| | | | | |
|---|---|---|---|---|
| 5,521,910 A | * | 5/1996 | Mathews | 370/54 |
| 5,684,791 A | * | 11/1997 | Raychaudhuri et al. | 370/278 |
| 5,694,548 A | * | 12/1997 | Baugher et al. | 370/200.12 |
| 6,031,832 A | * | 2/2000 | Turina | 370/348 |
| 6,081,513 A | * | 6/2000 | Roy | 370/260 |
| 6,104,929 A | * | 8/2000 | Josse et al. | 455/445 |

OTHER PUBLICATIONS

Global System for Mobile Communications, *Digital Cellular Telecommunications System; Mobile Station—Serving GPRS Support Node (MS–SGSN) Logical Line Control (LLC) Layer Specification*, European Telecommunications Standards Institute, (GSM 04.64) Mar. 1997.

* cited by examiner

Primary Examiner—Chau Nguyen
Assistant Examiner—Som-Dong Hyun
(74) Attorney, Agent, or Firm—Burns, Doane, Swecker & Mathis, L.L.P.

(57) ABSTRACT

The present invention relates to a method related to GPRS (General Packet Radio Service) system providing packet switched connections throughout a communication network, especially a PLMN (Public Land Mobile Network), connections being related to different QoS (Quality of Service) levels between end users, wherein an LLC (Logic Link Control) protocol is a packet oriented protocol, and wherein an LLC (Logic Link Control) is established when one mobile station activates one PDP context with a QoS for which the MS (Mobile Station) does not already have an LLC established, and in order to avoid separate handling of several logic links for one mobile station, and in order to avoid assignment of new link identities internally within an SGSM and at change of SGSN, it is according to the present invention suggested that the method involves the use of one LLC (Logic Link) with an independent set of link state variables per QoS, so as to allow independent handling of different QoS within said link.

9 Claims, 2 Drawing Sheets

Example 1 of Control Field Format for an Information Frame

| Format | 8 | 7 | 6 | 5 | 4 | 3 | 2 | 1 |
|---|---|---|---|---|---|---|---|---|
| I Format (I + S) | S1 | | N(S) | | | | | 0 |
| | S2 | R1 | R2 | R3 | R4 | R5 | R6 | P/F |
| | X | | N(R) | | | | | X |

Example 2 of Control Field Format
of an Information Frame

| Format | 8 | 7 | 6 | 5 | 4 | 3 | 2 | 1 |
|---|---|---|---|---|---|---|---|---|
| I Format (I + S) | S1 | N(S) | | | | | | 0 |
| | S2 | 1 | 0 | 0 | 1 | 0 | 1 | P/F |
| | X | N(R)6 | | | | | | X |
| | X | N(R)3 | | | | | | X |
| | X | N(R)1 | | | | | | X |

FIG. 3

Example 3

The control field in a combined information and supervisory frame (I+S format) where no acknowledgement is sent may look like Fig. 4.

| Format | 8 | 7 | 6 | 5 | 4 | 3 | 2 | 1 |
|---|---|---|---|---|---|---|---|---|
| I Format (I + S) | S1 | N(S) | | | | | | P/F |
| | S2 | 0 | 0 | 0 | 0 | 0 | 0 | 0 |

FIG. 4

METHOD RELATED TO GPRS (GENERAL PACKET RADIO SERVICE) SYSTEM PROVIDING PACKET SWITCHED CONNECTIONS

FIELD OF THE INVENTION

The present invention concerns a method related to GPRS (General Packet Radio Service) system providing packet switched connections throughout a communication network, especially a PLMN (Public Land Mobile Network), said connections being related to different QoS (Quality of Service) levels between end users, wherein an LLC (Logic Link Control) protocol is a packet oriented protocol, and wherein an LLC is established when one mobile station activates one PDP context with a QoS for which the MS (Mobile Station) does not already have an LLC establishment.

GPRS, that is currently specified by ETSI as a service for GSM phase 2+, provides packet switched connections throughout the PLMN. The packet switching is performed between the nodes in the network and on the radio interface. It is currently specified for four different quality of service levels in order to offer different types of subscriptions with different demands for the efficiency between the end users.

The most critical part of the transmission is between a mobile station and the SGSN (Serving GPRS Support Node). The change of the mobile stations position and the fact that several users share the same radio resources makes prediction of QoS difficult because of the chosen LLC protocol.

The protocol stack for GPRS (MS-SGSN) is shown in the enclosed FIG. 1.

1. The Problem Area

The nature of the LLC protocol is a packet oriented protocol where the packets must be received in the same order as they are sent. The philosophy has been that one mobile station is assigned one Logic Link where a number of PDP contexts can be activated. The SNDCP layer will multiplex all PDP contexts for one mobile station on the Logic Link. This may result in having one subscriber attached to the GPRS system with e.g. four different PDP contexts, each PDP context with a different QoS. The QoS requirements for GPRS have started discussions whether the BSS (Base Station System) in situations with high traffic may alter the packet flow for a single MS by taking the QoS into account in the packet processing between the MS and the SGSN.

2. Prior Art

The current approach for the GPRS standardization is to have several Logic Links for one mobile station. When one mobile station activates one PDP context with a QoS for which the mobile station does not already have a Logic Link established, a Logic Link is established.

This may result in having one subscriber attached to the GPRS system with e.g. four different PDP contexts, each PDP context with a different QoS and thereby a separate Logic Link.

3. Shortcomings of the Prior Art

The working assumption is complicated. It leads to separate handling of several Logic Links for one mobile station which cause extensive logic in the MS and the SGSN at PDP context activation/deactivation and a change of Logic Link (s) during assignment of new link identities internally within an SGSN and at change of SGSN.

SUMMARY OF THE INVENTION

An object of the present invention is to provide an improved method for controlling multiple quality of service levels in a communication network, especially a PLMN (Public Land Mobile Network).

Another object of the present invention is to avoid separate handling of several logic links for one mobile station, so as to avoid extensive logic in any MS and any SGSN at PDP context activation/deactivation.

A further object of the present invention is to have an efficient change of logic link changes.

These objects are achieved by means of a method as stated in the preamble, which according to the present invention is characterized in that the method involves the use of one LL (logic link) with an independent set of link state variables per QoS, so as to allow independent handling of different QoS within said link.

In other words, the proposed solution can be characterized by being one Logic Link (to ease the handling of Logic Link) with an independent set of logic link state variables (LLSV) per QoS (in order to have an independent handling of different QoS within the Logic Link).

It may be possible to acknowledge several QoSs in one supervisory frame using a bit-mapped Logic Link State Variable Indicator.

MERITS OF THE INVENTION

The invention makes it possible to handle different QoSs at the same Logic Link even though the sequence of frames received at the terminating peer may not be the same as the sequence of the frames sent from the originating peer.

Further features and advantages of the present invention will appear from the following description taken in connection with the appended drawings, as well as from the enclosed patent claims.

BRIEF DISCLOSURE OF THE INVENTION

FIG. 3 is a schematic diagram illustrating a second example of control field format for an information frame wherein a certain number of Logic Link State Variables are acknowledged.

FIG. 4 is a schematic diagram illustrating a third example of control field format for an information frame in a combined information frame and supervisory frame where no acknowledgement is sent.

DETAILED DESCRIPTION OF EMBODIMENTS

Figures 1, 2:
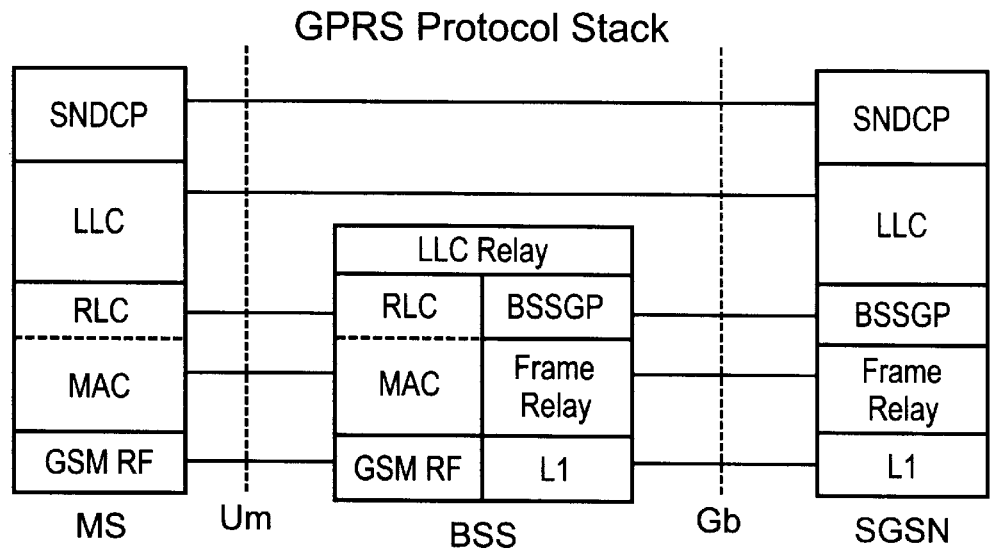
FIG. 1 is a block diagram illustrating the protocol stack for GPRS (MS-SGSN).
FIG. 2 is a schematic diagram illustrating a first example of control field format for an information frame, when supporting six Quality of Service levels.

A Logic Link (LL) handling more than one Quality of Service (QoS) requires that packets with different QoS may pass each other at the Logic Link level. This can be achieved by introducing one set of Logic Link State Variables per Quality of Service in the Logic Link state machine.

In the information frame (I format), a Logic Link State Variable Indicator has to indicate which QoS is defined for the current frame. The Service Access Point Identifier (SAPI) in the Address Field of the frame may be used for this purpose.

In the supervisory frames (S format), a Logic Link State Variable Indicator has to indicate which QoSs the possible acknowledgement are regarding. Note that a supervisory frame may also be piggy-backed an information frame, i.e. they are using a common control field. Using a bit-mapped field for indication of QoSs, it is possible to acknowledge several QoSs in one supervisory frame.

The control field in the supervisory frames can be of variable length according to the QoSs to be acknowledged, i.e. only the receive state variables for the QoSs to be acknowledged are included according to the bit-mapped Logic Link State Variable Indicator field.

The maximum number of outstanding frames (window size) may be defined either per set of Logic Link state variables or common for the Logic Link state machine, or a combination of both.

The number of Logic Link State Variable Indicator sets may vary between different vendors of MSs or SGSNs. In the link set-up procedure, the number of Logic Link State Variable Indicator sets may be negotiated. In cases where only one set is supported, the Logic Link State Variable. Indicator parameter may be omitted to save one byte in most information frames.

For further information about Logic Link Control Protocol, see GSM 04.64, Version: 0.2.0 (Draft a), Date: March 1997, European Telecommunications Standards Institute 1997.

In the following there will be disclosed three examples of control field format for an information frame.

EXAMPLE 1

The control field for a combined information frame and supervisory frame (I+S format) may look like FIG. 2, when supporting six Quality of Service levels. The Service Access Point Identifier (SAPI) in the Address Field defines the QoS for N(S).

In FIG. 2 the symbols included therein are as follows:

| | |
|---|---|
| $S_x$ | Supervisory Function Bit |
| N(S) | Transmitter Send Sequence Number |
| $R_1$–$R_6$ | Logic Link State Variable Indicator |
| N(R) | Transmitter Receive Sequence Number |
| X | Spare |
| P/F | Poll/Final bit |

EXAMPLE 2

The control field in a combined information frame and supervisory frame (I+S format) where Logic Link State Variables 1,3 and 6 are acknowledged will according to this example look like FIG. 3. (Supervisory Function Bits ($S_x$) and Poll/Final Bit (P/F) not regarded).

EXAMPLE 3

The control field in a combined information frame and supervisory frame (I+S format) where no acknowledgement is sent may look like FIG. 4.

It is to be understood that many more examples can be contemplated, all of which being within the scope and teachings of the present invention, namely a method to, by independent handling of different connected packet flows, e.g. characterized by a unique QoS, be able to handle several packet flows within the context of a single connection, e.g. characterized by being one logic link.

Further, the present invention supports a principle of having separate link state variables for each connected packet flow, e.g. characterized by a specific QoS.

More specifically, the invention supports a principle of letting an acknowledgement for received packets for several connected packet flows, e.g. characterized by several QoSs, be acknowledged by one acknowledgement with an individual acknowledgment per connected packet flow, e.g. characterized by each QoS within the acknowledgement.

References

GSM 04.64, Version: 0.2.0 (Draft a), Date: March 1997, European Telecommunications Standards Institute 1997.

What is claimed is:

1. A method for use in a GPRS (General Packet Radio Service) system providing packet switched connections throughout a communication network, especially a PLMN (Public Land Mobile Network), said connections having different QoS (Quality of Service) levels between end users, wherein an LLC (Logic Link Control) protocol is a packet oriented protocol, and wherein an LLC layer is established when one MS (mobile station) activates one PDP (Packet Data Protocol) context with a QoS for which said MS does not already have said LLC layer established, comprising the steps of:

utilizing one LLC layer with an independent set of link state variables per QoS, so as to allow independent handling of different QoS within said LLC layer; and utilizing one supervisory frame and using a bit-mapped LLSVI (Logic Link State Variable Indicator) for acknowledging several QoSs in said supervisory frame.

2. A method for use in a GPRS (General Packet Radio Service) system providing packet switched connections throughout a communication network, especially a PLMN (Public Land Mobile Network), said connections having different QoS (Quality of Service) levels between end users, wherein an LLC (Logic Link Control) protocol is a packet oriented protocol, and wherein an LLC layer is established when one MS (mobile station) activates one PDP (Packet Data Protocol) context with a QoS for which said MS does not already have said LLC layer established, comprising the steps of:

utilizing one LLC layer with an independent set of link state variables per QoS, so as to allow independent handling of different QoS within said LLC layer; and utilizing a LLSVI (Logic Link state Variable Indicator) in information frames I format a LLSVI to indicate which QoS is defined in a current frame.

3. A method for use in a GPRS (General Packet Radio Service) system providing packet switched connections throughout a communication network, especially a PLMN (Public Land Mobile Network), said connections having different QoS (Quality of Service) levels between end users, wherein an LLC (Logic Link Control) protocol is a packet oriented protocol, and wherein an LLC layer is established when one MS (mobile station) activates one PDP (Packet Data Protocol) context with a QoS for which said MS does not already have said LLC layer established, comprising the steps of:

utilizing one LLC layer with an independent set of link state variables per QoS, so as to allow independent handling of different QoS within said LLC layer; and utilizing a SAPI (Service Access Point Identifier) in the AF (Address Field) of a frame as a LLSVI.

4. A method for use in a GPRS (General Packet Radio Service) system providing packet switched connections throughout a communication network, especially a PLMN (Public Land Mobile Network), said connections having different QoS (Quality of Service) levels between end users, wherein an LLC (Logic Link Control) protocol is a packet oriented protocol, and wherein an LLC layer is established when one MS (mobile station) activates one PDP (Packet Data Protocol) context with a QoS for which said MS does not already have said LLC layer established, comprising the steps of:

utilizing one LLC layer with an independent set of link state variables per QoS, so as to allow independent handling of different QoS within said LLC layer; and utilizing in supervisory frames S format, LLSVI (Logic Link State Variable Indicator) to indicate to which QoSs the possible acknowledgments are related, said supervisory frames also including a piggy-backed information frame, wherein said piggy-backed information frame comprises aid frames possibly using a common control field.

5. A method for use in a GPRS (General Packet Radio Service) system providing packet switched connections throughout a communication network, especially a PLMN (Public Land Mobile Network), said connections having different QoS (Quality of Service) levels between end users, wherein an LLC (Logic Link Control) protocol is a packet oriented protocol, and wherein an LLC layer is established when one MS (mobile station) activates one PDP (Packet Data Protocol) context with a QoS for which said MS does not already have said LLC layer established, comprising the steps of:

utilizing one LLC layer with an independent set of link state variables per QoS, so as to allow independent handling of different QoS within said LLC layer; and utilizing a control field in supervisory frame(s) of variable length according to the QoS or QoSs to be acknowledged.

6. A method for use in a GPRS (General Packet Radio Service) system providing packet switched connections throughout a communication network, especially a PLMN (Public Land Mobile Network), said connections having different QoS (Quality of Service) levels between end users, wherein an LLC (Logic Link Control) protocol is a packet oriented protocol, and wherein an LLC layer is established when one MS (mobile station) activates one PDP (Packet Data Protocol) context with a QoS for which said MS does not already have said LLC layer established, comprising the steps of:

utilizing one LLC layer with an independent set of link state variables per QoS, so as to allow independent handling of different QoS within said LLC layer;

handling different connected packet flows, each of which having a unique QoS within the context of one LLC layer,; and including in a bit-mapped LLSVI (Logic Link State Variable Indicator) field only the receive state variables for the QoS or QoSs to be acknowledged.

7. A method for use in a GPRS (General Packet Radio Service) system providing packet switched connections throughout a communication network, especially a PLMN (Public Land Mobile Network), said connections having different QoS (Quality of Service) levels between end users, wherein an LLC (Logic Link Control) protocol is a packet oriented protocol, and wherein an LLC layer is established when one MS (mobile station) activates one PDP (Packet Data Protocol) context with a QoS for which said MS does not already have said LLC layer established, comprising the steps of:

utilizing one LLC layer with an independent set of link state variables per QoS, so as to allow independent handling of different QoS within said LLC layer; and defining the maximum number of outstanding frames, window size, either per set of LLSVs (Logic Link State Variables) or common for a logic link state machine, or a combination of both.

8. A method for use in a GPRS (General Packet Radio Service) system providing packet switched connections throughout a communication network, especially a PLMN (Public Land Mobile Network), said connections having different QoS (Quality of Service) levels between end users, wherein an LLC (Logic Link Control) protocol is a packet oriented protocol, and wherein an LLC layer is established when one MS (mobile station) activates one PDP (Packet Data Protocol) context with a QoS for which said MS does not already have said LLC layer established, comprising the steps of:

utilizing one LLC layer with an independent set of link state variables per QoS, so as to allow independent handling of different QoS within said LLC layer; and omitting any LLSVI (Logic Link State Variables) when only one LLSV (Logic Link State Variable Indicator) is needed.

9. A method for use in a GPRS (General Packet Radio Service) system providing packet switched connections throughout a communication network, especially a PLMN (Public Land Mobile Network), said connections having different QoS (Quality of Service) levels between end users, wherein an LLC (Logic Link Control) protocol is a packet oriented protocol, and wherein an LLC layer is established when one MS (mobile station) activates one PDP (Packet Data Protocol) context with a QoS for which said MS does not already have said LLC layer established, comprising the steps of:

utilizing one LLC layer with an independent set of link state variables per QoS, so as to allow independent handling of different QoS within said LLC layer; and negotiating the number of LLSVs (Logic Link State Variables) during the link set-up procedure.

\* \* \* \* \*